United States Patent
Brunel et al.

(10) Patent No.: US 8,279,839 B2
(45) Date of Patent: Oct. 2, 2012

(54) TRANSMISSION METHOD IN A WIRELESS TELECOMMUNICATION SYSTEM INCLUDING AT LEAST A BASE STATION INTENDED TO COMMUNICATE WITH TERMINALS

(75) Inventors: Loic Brunel, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 336 days.

(21) Appl. No.: 11/873,004

(22) Filed: Oct. 16, 2007

(65) Prior Publication Data
US 2008/0240003 A1 Oct. 2, 2008

(30) Foreign Application Priority Data
Oct. 30, 2006 (EP) .................................. 06022612

(51) Int. Cl.
*H04J 3/00* (2006.01)
(52) U.S. Cl. ........ 370/336; 370/442; 370/500; 455/450; 709/226
(58) Field of Classification Search .................. None
See application file for complete search history.

(56) References Cited

U.S. PATENT DOCUMENTS

| | | | |
|---|---|---|---|
| 6,381,229 B1* | 4/2002 | Narvinger et al. | 370/328 |
| 6,810,023 B1 | 10/2004 | Dillinger et al. | |
| 7,463,616 B1* | 12/2008 | Earnshaw et al. | 370/347 |
| 2004/0114618 A1* | 6/2004 | Tong et al. | 370/431 |
| 2006/0068732 A1* | 3/2006 | Jin | 455/232.1 |
| 2007/0036066 A1* | 2/2007 | Thomas et al. | 370/208 |
| 2007/0053409 A1* | 3/2007 | Reunamaki et al. | 375/130 |
| 2008/0056184 A1* | 3/2008 | Green | 370/329 |

FOREIGN PATENT DOCUMENTS

| | | |
|---|---|---|
| EP | 1 233 566 A1 | 8/2002 |
| WO | WO 99/11004 | 3/1999 |
| WO | WO 9911004 A1 * | 3/1999 |

* cited by examiner

*Primary Examiner* — Nittaya Juntima
*Assistant Examiner* — Khoa Huynh
(74) *Attorney, Agent, or Firm* — Oblon, Spivak, McClelland, Maier & Neustadt, L.L.P.

(57) ABSTRACT

A transmission method in a wireless telecommunication system including at least a base station intended to communicate with terminals over bidirectional communication channels, wherein one or more supplementary symbols that are formed of a set of pilot sequence elements are transmitted between the base station and the terminal during a time delay. The method includes the steps of: obtaining the multiplexing resources of the wireless telecommunication system, assigning to at least one obtained multiplexing resource, pilot sequence elements, and transferring at least one supplementary symbol that includes pilot sequence elements.

15 Claims, 9 Drawing Sheets

| | 1051 | 1052 | 1053 | 1054 | 1055 | 1056 |
|---|---|---|---|---|---|---|
| 1001 | TE1 | TE1 | TE1 | TE1 | PS1 | PS13 |
| 1002 | TE1 | TE1 | TE1 | TE1 | PS2 | PS14 |
| 1003 | TE1 | TE1 | TE1 | TE1 | PS3 | PS15 |
| 1004 | TE2 | TE2 | TE2 | TE2 | PS4 | PS16 |
| 1005 | TE2 | TE2 | TE2 | TE2 | PS5 | PS17 |
| 1006 | TE2 | TE2 | TE2 | TE2 | PS6 | PS18 |
| 1007 | TE3 | TE3 | TE3 | TE3 | PS7 | PS19 |
| 1008 | TE3 | TE3 | TE3 | TE3 | PS8 | PS20 |
| 1009 | TE3 | TE3 | TE3 | TE3 | PS9 | PS21 |
| 1010 | TE1 | TE1 | TE1 | TE1 | PS10 | PS22 |
| 1011 | TE1 | TE1 | TE1 | TE1 | PS11 | PS23 |
| 1012 | TE1 | TE1 | TE1 | TE1 | PS12 | PS24 |

|      | 1151 | 1152 | 1153 | 1154 | 1155 | 1156 |
|------|------|------|------|------|------|------|
| 1101 | TE1  | TE1  | TE1  | TE1  | PS30 | data |
| 1102 | TE1  | TE1  | TE1  | TE1  | data | data |
| 1103 | TE1  | TE1  | TE1  | TE1  | data | data |
| 1104 | TE2  | TE2  | TE2  | TE2  | PS31 | data |
| 1105 | TE2  | TE2  | TE2  | TE2  | data | data |
| 1106 | TE2  | TE2  | TE2  | TE2  | data | data |
| 1107 | TE3  | TE3  | TE3  | TE3  | PS32 | data |
| 1108 | TE3  | TE3  | TE3  | TE3  | data | data |
| 1109 | TE3  | TE3  | TE3  | TE3  | data | data |
| 1110 | TE1  | TE1  | TE1  | TE1  | PS33 | data |
| 1111 | TE1  | TE1  | TE1  | TE1  | data | data |
| 1112 | TE1  | TE1  | TE1  | TE1  | data | data |

Fig. 10b

|      | 1251 | 1252 | 1253 | 1254 | 1255 | 1256 |
|------|------|------|------|------|------|------|
| 1201 | TE1  | TE1  | TE1  | TE1  | PS40 |      |
| 1202 | TE1  | TE1  | TE1  | TE1  |      |      |
| 1203 | TE1  | TE1  | TE1  | TE1  |      |      |
| 1204 | TE2  | TE2  | TE2  | TE2  | PS41 |      |
| 1205 | TE2  | TE2  | TE2  | TE2  |      |      |
| 1206 | TE2  | TE2  | TE2  | TE2  |      |      |
| 1207 | TE3  | TE3  | TE3  | TE3  | PS42 |      |
| 1208 | TE3  | TE3  | TE3  | TE3  |      |      |
| 1209 | TE3  | TE3  | TE3  | TE3  |      |      |
| 1210 | TE1  | TE1  | TE1  | TE1  | PS43 |      |
| 1211 | TE1  | TE1  | TE1  | TE1  |      |      |
| 1212 | TE1  | TE1  | TE1  | TE1  |      |      |

Fig. 10c

| | 1356 | 1355 | 1351 | 1352 | 1353 | 1354 |
|---|---|---|---|---|---|---|
| 1301 | | | TE1 | TE1 | TE1 | TE1 |
| 1302 | | | TE1 | TE1 | TE1 | TE1 |
| 1303 | | | TE1 | TE1 | TE1 | TE1 |
| 1304 | | PS50 | TE2 | TE2 | TE2 | TE2 |
| 1305 | | PS51 | TE2 | TE2 | TE2 | TE2 |
| 1306 | | PS52 | TE2 | TE2 | TE2 | TE2 |
| 1307 | PS56 | PS53 | TE3 | TE3 | TE3 | TE3 |
| 1308 | PS57 | PS54 | TE3 | TE3 | TE3 | TE3 |
| 1309 | PS58 | PS55 | TE3 | TE3 | TE3 | TE3 |
| 1310 | | | TE1 | TE1 | TE1 | TE1 |
| 1311 | | | TE1 | TE1 | TE1 | TE1 |
| 1312 | | | TE1 | TE1 | TE1 | TE1 |

| | 124 | 125 | 126 | 127 | 128 | 129 |
|---|---|---|---|---|---|---|
| 120 | TE1 | TE1 | TE1 | TE1 | PSa | PSe |
| 121 | TE1 | TE1 | TE1 | TE1 | PSb | PSf |
| 122 | TE2 | TE2 | TE2 | TE2 | PSc | PSg |
| 123 | TE3 | TE3 | TE3 | TE3 | PSd | PSh |

TRANSMISSION METHOD IN A WIRELESS TELECOMMUNICATION SYSTEM INCLUDING AT LEAST A BASE STATION INTENDED TO COMMUNICATE WITH TERMINALS

BACKGROUND OF THE INVENTION

The present invention relates generally to telecommunication systems and in particular, to transmission methods and devices in a wireless telecommunication system including at least a base station intended to communicate with terminals over bidirectional communication channels.

Note that wireless telecommunication systems include mobile telecommunication systems in which mobile terminals may move over long distances and sometimes quickly but also telecommunication systems in which the terminals are fixed or may only move over short distances relative to the base station which they are connected to and often very slowly.

FIG. 1 diagrammatically shows a wireless cellular telecommunication system serviced by plural base stations. In the FIG. 1 only one base station BTS is depicted, the base station BTS intends to communicate with at least one terminal, here three terminals TE1, TE2 and TE3, over wireless communication channels Ch1 to Ch3 respectively.

In the FIG. 1, the terminal TE1 is at a distance d1 from the base station BTS, the terminal TE2 is at a distance d2 from the base station BTS and the terminal TE3 is at a distance d3 from the base station BTS. The area covered by a base station BTS is generally called a cell 15, the border of said cell being at a distance of the base station considered as maximal.

Each channel Chi, with i=1 to 3, is intended to support an uplink channel UL for carrying information from the terminal TEi to the base station BTS and a downlink channel DLi for carrying information from the base station BTS to the terminal TEi. Said information is enclosed within frames split into time slots or sub frames allocated either to the uplink channel ULi or to the downlink channel DLi.

The frame is for example of the type depicted in FIG. 4, i.e. of the HD/OFDM type (standing for Half Duplex/Orthogonal Frequency Division Multiplex) either TDD/OFDM (Time Division Duplex/OFDM) or FDD/OFDM (Frequency Division Duplex). As it can be seen at FIG. 4, this frame is subdivided into an integer number L of time slots or sub frames TS1 to TSL that can be allocated either to the downlink channel DL or to the uplink channel UL. Furthermore, each sub frame TSj (j=1 to L) supports $q_j$ symbols s1 to $sq_j$ (here, for the sub frame TSj, $q_j=4$), called OFDM symbols, respectively carried by k orthogonal modulation frequencies f1 to fk.

Note that each of the OFDM symbols s1 to $sq_j$ in a sub frame TSj generally includes a cyclic prefix that is used to combat inter-symbol interference.

It must be understood that in a general case the number of symbols per sub frame can vary from a sub frame to another.

In relation with FIG. 5 let's consider the transmission at time te of $q_j$=four symbols s1 to s4 over the downlink channel DL by a base station BTS. These symbols s1 to s4 are received by a terminal TE1 at the border of the considered cell 15 (at a distance d1 from the base station BTS) at a time equal to te+RTD(d1)/2, where RTD(d1) is the Round Trip Delay for that terminal TE1 at said distance d1 from the base station BTS. These symbols are processed by the terminal TE1 which then transmits also symbols over the uplink channel UL. Before transmitting symbols over the uplink channel UL, a terminal TE1 has to wait for a period of time, said Receive Transmit Switch time or simply switching time and referred to as RTS, in order to take into account the duration of hardware and software operations. For instance, this delay RTS is the maximum of the time needed by hardware equipments of the terminals TE to switch between reception and transmission modes and the time needed by hardware equipments of the base station BTS to switch between transmission and reception modes. The symbols transmitted over the uplink channel UL are received at the base station BTS at a time tr equal to te+RTD(d1)+RTS+$D_{DL}$, $D_{DL}$ being the total duration of the $q_j$ symbols. It can thus be seen that the base station BTS has to wait for the reception of the symbols transmitted by a terminal TEi located at the border of the cell 15 in order to perform the processing thereof. The waiting time is called the Guard Period GP, or idle period and must be equal at least to the round trip delay RTD(d1) plus the Receive Transmit Switch time RTS.

When a single terminal is involved in the present invention, it is named terminal TEi, with i=1 or 2 or 3 and so on up to the maximum number of terminals comprised in the coverage area of the Base station BTS.

When at least two terminals are involved in the present invention, they are named terminals TE.

Guard periods GP between downlink channels DL and uplink channels UL can be seen on FIG. 4.

The base station BTS determines a timing delay TD(d) for each of the terminals TE. The base station BTS transfers symbols to the terminals TE which transfer in response symbols to the base station BTS. These symbols are as example reference signals.

The timing delay is calculated using the following formula:

$$TD(d)=tr-te-D_{DL}-RTD(d)=GP-RTD(d),$$

where d is the distance between each terminal TEi and the base station BTS.

From each timing delay, the base station BTS determines the Timing Advance TA=GP−TD(d) for each terminal and transfers the Timing Advance to the corresponding terminal TEi.

Each terminal applies its Timing Advance value for the transmission of symbols over the uplink channel UL in such a manner that the transmitted symbols are received at the base station BTS from all the terminals TE connected thereto at the same time tr.

The problem addressed by the telecommunication system afore described is related to a potential loss of resources resulting from the fact that during the guard period GP no information of any sort is transmitted or received at the base station.

In order to solve that problem, the inventors of the present invention have proposed in the European patent application EP 05291972 a new transmission scheme of information in the downlink channel or in the uplink channel.

In the patent application EP05921972, the base station BTS transmits at least a supplementary downlink symbol during the guard period to terminals TE that can receive said at least supplementary downlink symbol thereof and/or the base station BTS receives during the guard period at least a supplementary uplink symbol from the terminals TE that can transmit said at least supplementary uplink symbols during the time delay thereof.

Such technique is described in more details in reference to the FIG. 6.

In the FIG. 6, $n_{ref}$ symbols s1 to s4 are transferred in a nominal part of a sub frame over the downlink channel DL by the base station BTS at a time referred to as te.

The nominal part of a downlink sub frame is the total duration of the $q_j$ symbols which can be transmitted to terminals TE which are located at the border of the cell or in other words to any terminal located in the cell of the base station BTS.

The nominal part of an uplink sub frame is the total duration of the $q_j$ symbols which can be transmitted by the terminals TE which are located at the border of the coverage area of the base station BTS.

After having transmitted the last downlink symbol s4 of the nominal part of a sub frame, the base station BTS has to wait during the guard period GP, up to time tr, for receiving uplink symbols from all the terminals TE connected thereto. The duration of the nominal part of a sub frame in the downlink channel is referred to as Dref corresponding to reference number $n_{ref}$ of symbols, for example four.

The base station BTS is provided for including supplementary downlink symbols in a downlink sub frame, said supplementary downlink symbols being intended to be transmitted only to the terminals TE that can receive and process them during the respective time delay thereof.

If for a terminal situated at a distance d from a base station BTS, the time delay TD(d) is comprised between the duration of a number $n_{dl}$ of downlink symbols and the duration of a number $n_{dl}+1$ of downlink symbols, respectively plus the switching time RTS, the base station BTS can insert information for that terminal in $n_{dl}$ supplementary downlink symbols. This condition can be mathematically written as follows:

$$\text{if } n_{dl} \cdot ts_{dl} \leq TD(d) - RTS < (n_{dl}+1) ts_{dl}$$

then insert at most $n_{dl}$ supplementary symbols.

$ts_{dl}$ being the duration of one downlink symbol.

When inserting information for a terminal TEi in $n_{dl}$ supplementary downlink symbols, the base station BTS indicates this insertion to that terminal TEi (by way of signalling) in order to enable the terminal TEi to read and process this $n_{dl}$ supplementary symbol or these $n_{dl}$ supplementary symbols along with the other symbols comprised in the nominal part of the downlink sub frame.

The base station BTS informs each terminal TEi connected thereto about the time delay TD or the Timing Advance it has to apply. Then, each terminal TEi, by using the just above expression, deduces from the value of the time delay TD or from the value of the Timing Advance the number of symbols that it has to read and to process.

The number $n_{dl}$ of supplementary downlink symbols that the base station BTS can allocate to a terminal TEi at a distance d of the base station BTS is thus determined in the following way:

$$n_{dl} = \text{integer}\{(TD(d)-RTS)/ts_{dl}\} = \text{integer}\{(GP-RTD(d)-RTS)/ts_{dl}\}$$

The maximum number $N_{dl}$max of supplementary symbols is given for a terminal TEi that would be located at a zero distance from the base station BTS and for which the round trip delay RTD is zero:

$$N_{dl}\text{max} = \text{integer}\{(GP-RTS)/ts_{dl}\}$$

Similar formulas as the above mentioned formulas are used for supplementary uplink channels.

As example, in the case depicted in FIG. 6, as the number $N_{dl}$max is two, the total number of transmitted downlink symbols is now equal to four downlink symbols s1 to s4 of the nominal part Dref of a sub frame and two supplementary downlink symbols s5 and s6 that are transmitted in the period that is usually considered as a guard period GP. The value of the time delay TD(d1) for a terminal TE1 at the border of the cell 15, is equal to the switching time RTS in virtue of the definition of the time delay. Only the four downlink symbols s1 to s4 of the nominal part Dref of a sub frame are allocated by the base station BTS to said terminal TE1. The terminal TE1 only reads and processes those four downlink symbols s1 to s4, the two supplementary symbols s5 and s6, if any, being ignored or not processed.

The value of the time delay TD(d2) for the terminal TE2 is smaller than the duration of two downlink symbols plus the switching time but is however equal to the duration of one downlink symbol plus the switching time RTS. So, the base station BTS can transmit information to that terminal TE2 within at most one supplementary downlink symbol (here the downlink symbol s5 which follows the last downlink symbol s4 of the nominal part Dref of a downlink sub frame) which is read and processed by said terminal TE2. Symbol s6, if any, is ignored by said terminal TE2 or not processed. In this case, the total number of downlink symbols that can include information for that terminal TE2 is five (the four of the nominal part Dref of a sub frame s1 to s4 plus one supplementary symbol s5).

According to the example of the FIG. 6, the value of the time delay TD(d3) for the terminal TE3 is equal to the duration of two downlink symbols plus the switching time RTS. So, the base station BTS can transmit information to that terminal TE3 within at most two supplementary downlink symbols s5 and s6 which are read and processed by said terminal TE3. The total number of downlink symbols that include information for that terminal TE3 is six (four of the nominal part Dref of a sub frame s1 to s4 plus two supplementary downlink symbols s5 and s6).

The base station BTS can transmit information to any terminal TEi located at a distance d of the base station comprised between the distance d2 of the terminal TE2 and the distance d3 of the terminal TE3 with at most five downlink symbols that it can read and process. In the same way, the base station BTS can transmit information to any terminal located at a distance d shorter than the distance d3 of the terminal TE3 within at most six downlink symbols that it can read and process. Always in the same way, the base station BTS can transmit information to any terminal located at a distance d larger than the distance d2 of the terminal TE2 within at most four symbols that it can read and process.

Note that the downlink symbol s5 contains information only for the terminals TE that are located at a distance from the base station BTS lower than d2 whereas downlink symbol s6 contains information only for the terminals TE that are located at a distance from the base station BTS lower than d3.

When a terminal TEi gets connected to the base station BTS, no information about the time delay TD it has to apply has been received. As long as it is not done, the number of symbols allocated to this terminal TEi is equal to the reference number $n_{ref}$ i.e. the number of symbols allocated to this terminal TEi is equal to the number of symbols comprised in the nominal part Dref of the sub frame. Furthermore, the terminal TEi transmits in the uplink with a predefined time delay, for instance equal to the guard period GP or to RTS, after receiving a number of symbols equal to the reference number $n_{ref}$.

When the coverage area 15 of the base station BTS is large, i.e. the round trip delay RTD is large for some terminals TE located at the border of the coverage area 15, few symbols are received or transferred by these terminals TE. It is then difficult to include a large number of pilot sequence elements in the symbols comprised in the nominal part of a sub frame for the purpose of analysing the channel conditions which exist between the base station BTS and the terminals TE without decreasing in an important manner the quantity of data transfer through the uplink or downlink channels.

BRIEF SUMMARY OF THE INVENTION

The present invention intends to solve above mentioned problem by increasing the quantity of pilot sequence elements in the symbols transferred between the base station and the terminals.

To that end, the present invention concerns a transmission method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to at least two terminals, wherein the time delay of each terminal connected thereto is determined, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance, and wherein the transfer of at least one supplementary symbol between the base station and at least one terminal that can receive or transmit said at least one supplementary symbol during the time delay is enabled,
the method being characterised in that it comprises the steps of:
obtaining multiplexing resources of the wireless telecommunication system for the transfer of symbols to be transferred,
assigning to at least one obtained multiplexing resource, a set of pilot sequence elements,
transferring the at least one supplementary symbol, the supplementary symbol being formed at least by the set of pilot sequence elements.

The present invention concerns also a telecommunication device in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to at least two terminals, wherein the time delay of each terminal connected thereto is determined, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance, and wherein the transfer of at least one supplementary symbol between the base station and at least one terminal that can receive or transmit said at least one supplementary symbol during the time delay is enabled,
the telecommunication device being characterised in that it comprises:
means for obtaining multiplexing resources of the wireless telecommunication system for the transfer of symbols to be transferred,
means for assigning to at least one obtained multiplexing resource, a set of pilot sequence elements,
means for transferring the at least one supplementary symbol, the supplementary symbol being formed at least by the set of pilot sequence elements.

Thus, the quantity of pilot sequence elements transferred between the base station and the terminals is increased.

According to a particular feature, the multiplexing resources of the wireless telecommunication network are chunks of frequencies and/or codes and/or areas of a coverage area of the base station.

According to a particular feature, the method is executed by the base station or the telecommunication device is a base station.

Thus, a terminal located near the base station gets an important number of pilot sequence elements and can then determine accurately the channel conditions for the downlink channel.

According to a particular feature, the multiplexing resources are obtained by analysing the channel conditions which exist between the base station and each terminal connected to the base station and the base station allocates the multiplexing resources of the wireless telecommunication system to at least two terminals for the de multiplexing of at least one set of pilot sequence elements.

Thus, as the terminals located near the base station get an important number of pilot sequence elements and can determine accurately the channel conditions for the downlink channel, the multiplexing resources are allocated on the basis of precise information.

According to a particular feature, a set of pilot sequence elements is assigned to each obtained multiplexing resource and each supplementary symbol is formed by the sets of pilot sequence elements.

Thus, a large amount of pilot sequence elements is transferred, the determination of the channel condition is improved. This is especially interesting for terminals moving at a high speed.

According to a particular feature, a set of pilot sequence elements is assigned to one multiplexing resource among the multiplexing resources allocated to one terminal.

Thus, the energy consumed for the transfer of pilot sequence elements is limited.

According to a particular feature, at least one set of pilot sequence elements is assigned to at least one multiplexing resource among the obtained multiplexing resources only for terminals which can receive at least one supplementary symbol.

Thus, the energy consumed for the transfer of pilot sequence elements is reduced.

According to a particular feature, the method is executed by a terminal or the telecommunication device is a terminal.

Thus, the base station gets an important number of pilot sequence elements for the terminals located near the base station and can then determine accurately the channel conditions for the uplink channel.

According to a particular feature, the multiplexing resources are obtained by receiving a message from the base station.

According to a particular feature, a set of pilot sequence elements is assigned to each obtained multiplexing resource.

Thus, a large amount of pilot sequence elements is transferred, the determination of the channel conditions is improved. This is especially interesting for terminals moving at a high speed.

According to a particular feature, a set of pilot sequence elements is assigned to one multiplexing resource among the obtained multiplexing resources.

Thus, the energy consumed for the transfer of pilot sequence elements is limited.

According to a particular feature, at least one set of pilot sequence elements is assigned to at least one multiplexing resource among the obtained multiplexing resources and at least one set of pilot sequence elements is assigned to at least one multiplexing resource different from the obtained multiplexing resources.

Thus, it is possible to execute some channel estimations on some other multiplexing resources.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

BRIEF DESCRIPTION OF THE SEVERAL VIEWS OF THE DRAWINGS

The characteristics of the invention will emerge more clearly from a reading of the following description of an example embodiment, the said description being produced with reference to the accompanying drawings, among which:

FIG. 9 is an example of the channel quality indication determined between the base station and each terminal according to the first and second modes of realisation of the present invention;

FIGS. 10a to 10c are examples of symbols transferred by the base station on the multiplexing resources of the wireless telecommunication system to the terminals according to the first and second modes of realisation of the present invention;

DETAILED DESCRIPTION OF THE INVENTION

Figure 1:
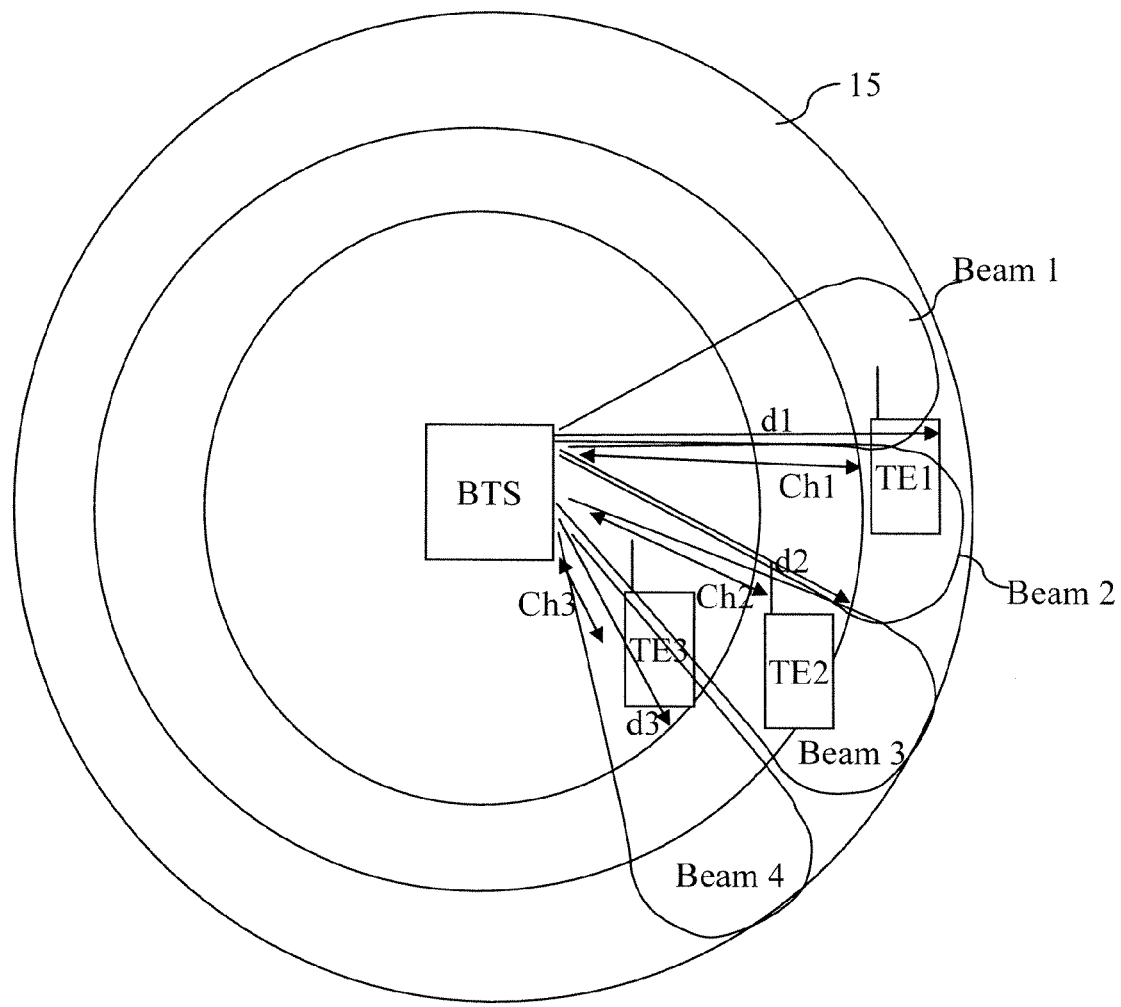
FIG. 1 is a diagram representing the architecture of the wireless telecommunication system in which the present invention is implemented.

FIG. 1 is a diagram representing the architecture of the wireless telecommunication system in which the present invention is implemented.

In the telecommunication system of the FIG. 1, at least one and preferably plural terminals TE, TE2 and TE3 are comprised in a coverage area 15 of a base station BTS. The base station BTS intends to communicate with at least one terminal TEi, here three terminals TE1, TE2 and TE3, over wireless communication channels CH1 to CH3 respectively.

The present invention will be described in a wireless network like a wireless cellular network or a local area network but the present invention is also applicable to wired networks like power line networks. Only one coverage area of the base station BTS is shown in the FIG. 1 for the sake of simplicity but in practice, and especially when the wireless network is a wireless cellular network, the wireless cellular telecommunication system is composed of a more important number of base stations and cells.

Only three terminals TE are shown in the FIG. 1 for the sake of simplicity but in practice, a more important number of terminals are in the coverage area 15 of the base station BTS.

The base station BTS is also named a node or a node B or an enhanced node B or an access point.

The terminals TE1 to TE3 are terminals like mobile phones, personal digital assistants, or personal computers.

The base station BTS is provided for including supplementary downlink symbols, said supplementary downlink symbols being intended to be transmitted only to the terminals TE that can receive and process and/or transmit them during the respective time delay thereof. The base station BTS is also provided for including supplementary uplink symbols, said supplementary uplink symbols being intended to be transmitted only by the terminals TE that process them during the respective time delay thereof.

The base station BTS can insert information for a terminal TEi in $n_{dl}$ supplementary symbols. This condition can be mathematically written as follows $$\text{if } n_{dl} \cdot ts_{dl} \leq TD(d) - RTS < (n_{dl}+1) ts_{dl}$$

then insert at most $n_{dl}$ supplementary symbols.

$ts_{dl}$ being the duration of one downlink symbol.

Similar formulas as the above mentioned formulas are used for supplementary uplink channels.

It has to be noted here that $n_{dl}$ is also representative of the number of supplementary uplink symbols that the base station BTS can allocate to the terminal TEi.

According to the invention, the supplementary symbols comprise pilot sequence elements.

Figure 6:
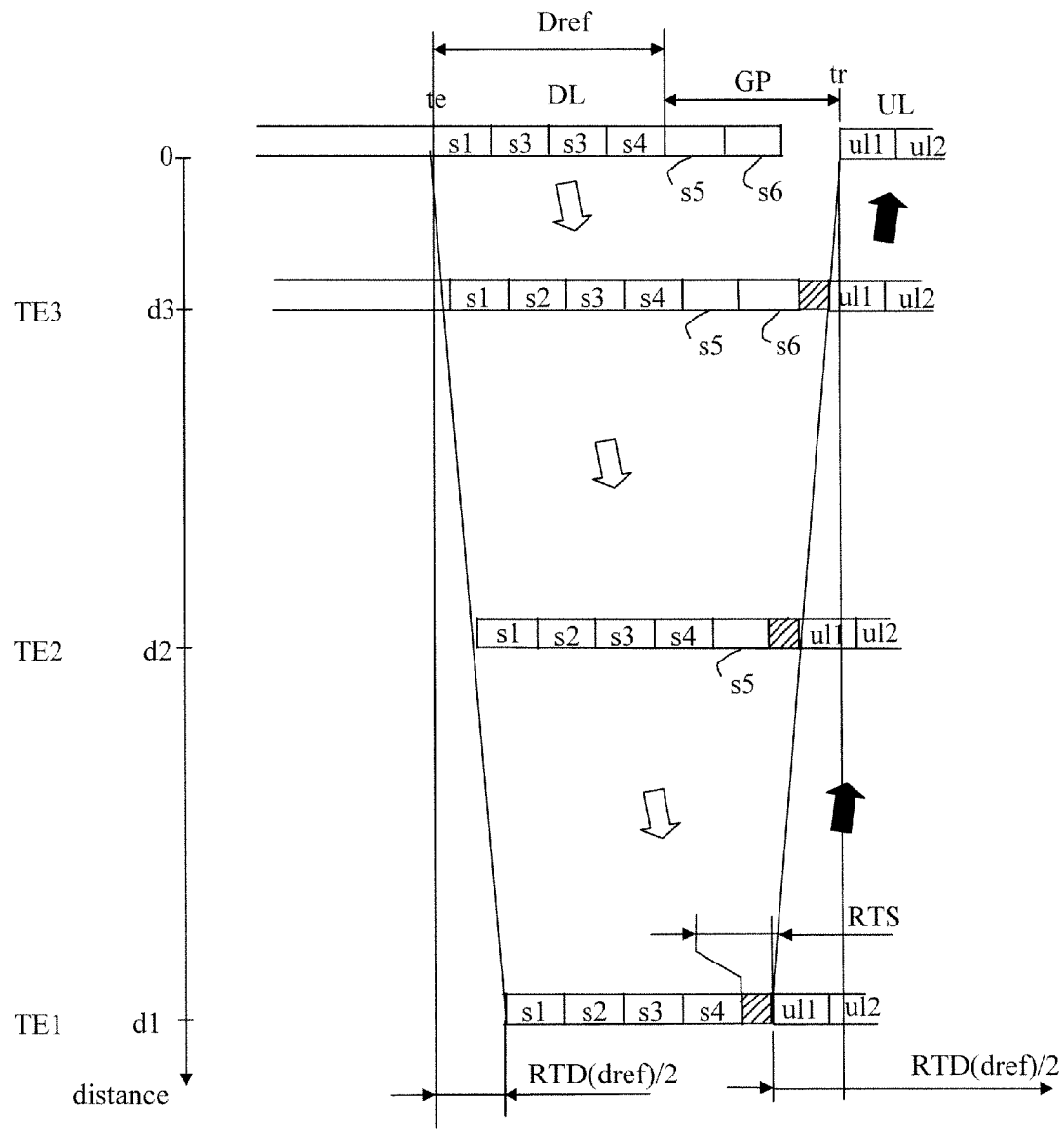
FIG. 6 is a chronogram depicting the transmission of information in the downlink of a telecommunication system according to the state of the art.

According to the examples of the FIGS. 1 and 6, the number $N_{dl}$max is two, but a more important number of supplementary symbols can be determined, as example, according to the coverage area 15 of the base station BTS and/or according to the duration of OFDM symbols.

As example, the wireless telecommunication system is a wireless telecommunication system which uses Time Division Duplexing scheme (TDD) or Frequency Division Duplexing scheme (FDD), more precisely half duplex FDD scheme.

In TDD scheme, the signals transferred in uplink and downlink channels are duplexed in different sub frames, named also time slots, in the same frequency band.

In half duplex FDD scheme, the signals transferred in uplink and downlink channels are duplexed in different sub frames, named also time slots, in different frequency bands.

When the base station BTS transfers symbols to a terminal TEi, with i=1 to 3, the data, the signals or the messages are transferred through downlink sub frames of the downlink channel.

When a terminal TEi, with i=1 to 3, transfers symbols to the base station BTS, the signals or data are transferred through uplink sub frames of the uplink channel.

In a first mode of realisation of the present invention, Frequency Division Multiple Access technique is used in the wireless telecommunication system in order to multiplex information of plural terminals TE.

In a second mode of realisation of the present invention, Code Division Multiple Access technique is used in the wireless telecommunication system in order to multiplex information of plural terminals TE.

In a third mode of realisation of the present invention, Space Division Multiple Access technique is used in the wireless telecommunication system in order to multiplex information of plural terminals TE. The Beams noted Beam1, Beam2, Beam3 and Beam4 in the FIG. 1 represent a part of the space division of the coverage area 15 of the base station BTS.

It has to be noted that the techniques used in the first and/or second and/or third modes of realisation can be also combined.

Preferably, when a terminal TEi transfers a symbol, the terminal TEi multiplexes data and/or at least a set of pilot sequence elements on allocated multiplexing resources, and sets null value on multiplexing resources which are not allocated to it. For some purposes of channel estimation, the terminal TEi may multiplex at least a set of pilot sequence elements on multiplexing resources which are not allocated to the terminal for the multiplexing of symbols comprised in the nominal part of the uplink sub frame.

The base station BTS receives symbols. Each received symbol is formed by the symbols transferred by at least a part of the terminals TE.

Preferably, when the base station BTS transfers a symbol, the base station BTS multiplexes data and/or at least a set of pilot sequence elements on allocated multiplexing resources, and set null value on multiplexing resources which are not allocated. For some purposes of channel estimation, the base station BTS may multiplex at least a set of pilot sequence elements on multiplexing resources which are not allocated for the multiplexing of symbols comprised in the nominal part of the downlink sub frame.

Figure 2:
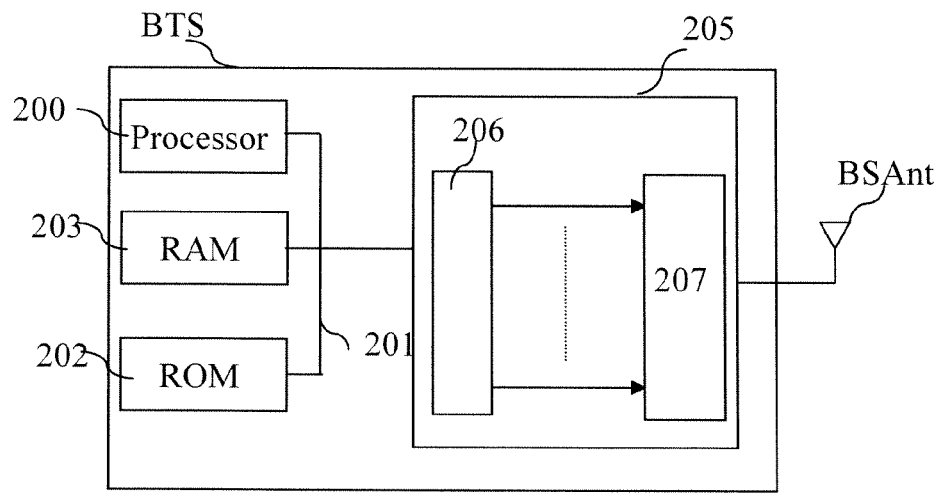
FIG. 2 is a diagram representing the architecture of a base station of the wireless telecommunication system according to the present invention.

FIG. 2 is a diagram representing the architecture of a base station according to the present invention.

Figure 7:
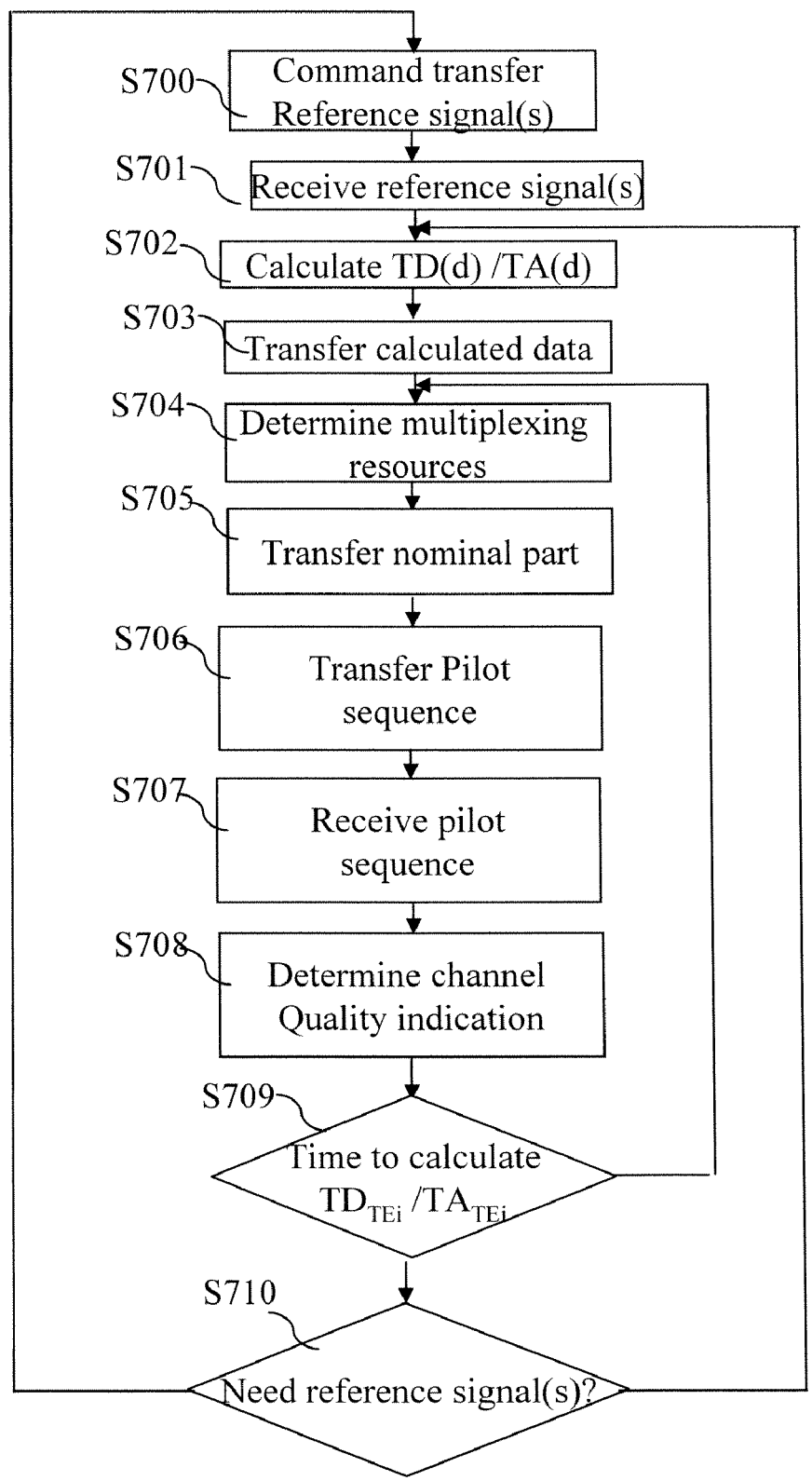
FIG. 7 is an algorithm executed by a base station according to the present invention.

The base station BTS has, for example, an architecture based on components connected together by a bus 201 and a processor 200 controlled by the program related to the algorithm as disclosed in the FIG. 7.

It has to be noted here that the base station BTS is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203 and a channel interface 205.

The read only memory ROM 202 contains instructions of the programs related to the algorithm as disclosed in the FIG. 7 which are transferred, when the base station BTS is powered on to the random access memory RAM 203.

The RAM memory 203 contains registers intended to receive variables, and the instructions of the programs related to the algorithm as disclosed in the FIG. 7.

The processor 200 is able to determine the multiplexing resources allocated to the terminals TE.

The multiplexing resources allocated to at least a part of the terminals TE are the multiplexing resources used by the corresponding terminal TEi for de multiplexing the downlink symbols of the nominal part of a downlink sub frame and/or are the multiplexing resources used by the corresponding terminal TEi for multiplexing the data in order to form uplink symbols of the nominal part of an uplink sub frame.

The multiplexing resources allocated to the at least one terminal TEi are the multiplexing resources used by the base station BTS for multiplexing at least one set of pilot sequence elements in order to form the supplementary downlink symbols and/or are the multiplexing resources used by the base station BTS for de multiplexing at least one set of pilot sequence elements comprised in the supplementary uplink symbols.

A pilot sequence element is as example equal to one or minus one or is a complex value.

A set of pilot sequence elements is multiplexed on at least a part of the carrier frequencies of a chunk of frequencies or on the code of a multiplexing resource.

A chunk of frequencies comprises at least one carrier frequency or comprises a group of carrier frequencies which are preferably consecutive.

The channel interface 205 comprises means for multiplexing 206 data on multiplexing resources in order to form each downlink symbol of the downlink sub frame to be transferred to at least a part of the terminals TE.

The channel interface 205 comprises means for requesting the transmission of at least one reference signal by each terminal TEi and means for receiving at least one reference signal from each terminal TEi.

The channel interface 205 comprises means for transferring at least one supplementary downlink symbol comprising at least one pilot sequence element to be transferred to at least one terminal TEi on multiplexing resources.

The channel interface 205 comprises means for de multiplexing the symbols comprised in the nominal part of an uplink sub frame transferred by at least one terminal TEi from the multiplexing resources allocated to the terminal TEi.

The channel interface 205 comprises means for de multiplexing at least one set of pilot sequence elements comprised in at least one uplink supplementary symbol transferred by at least one terminal TEi.

Preferably, at least one set of pilot sequence elements comprised in at least one supplementary uplink symbol is de multiplexed on the multiplexing resources allocated to the terminal TEi for the symbols comprised in the nominal part of the uplink sub frame.

The channel interface 205 comprises means for de-multiplexing at least one set of pilot sequence elements comprised in at least one supplementary uplink symbol from the multiplexing resources which are not allocated to the terminal TEi which sent the symbol in order to get information about channel conditions on other multiplexing resources.

The channel interface 205 comprises means for combining the data 207.

According to the first mode of realisation of the present invention, the means for combining the weighted data 207 are an Inverse Discrete Fourier Transform module.

According to the second mode of realisation of the present invention, the means for combining the weighted data 207 are a summation circuit.

According to the third mode of realisation of the present invention, the means for combining the weighted data 207 are beamformers and the antenna BSAnt is an array of antennas.

According to the third mode of realisation of the present invention, the channel interface 205 comprises means for directing the signals transferred by the base station BTS into different areas as the areas noted Beam1 to Beam 4 in the FIG. 1. More precisely, when the base station BTS transmits signals into a given area through the downlink channel, the signals are M times duplicated, where M>1, the duplicated signals are weighted in order to perform beamforming using M antennas, i.e. control the spatial direction of the transmitted signals in order to form N beams.

Figure 3:
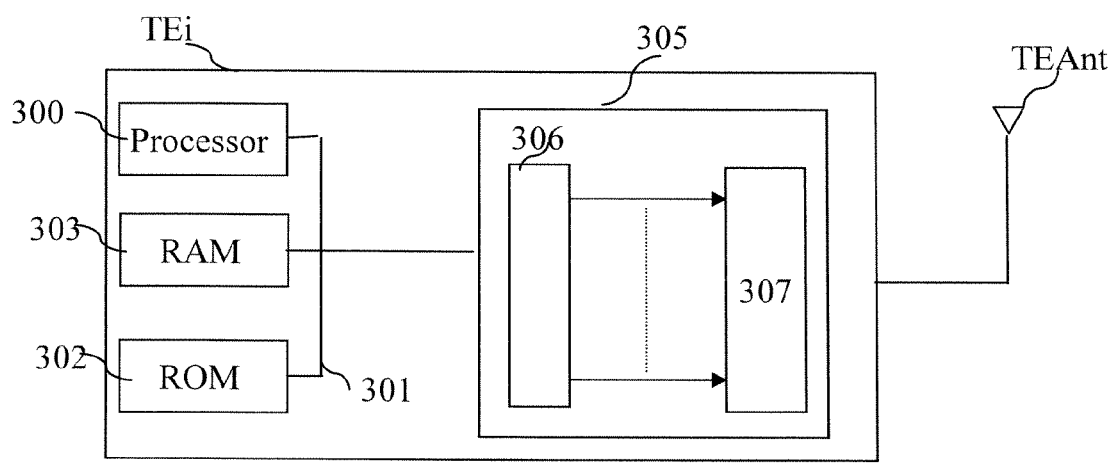
FIG. 3 is a diagram representing the architecture of a terminal the wireless telecommunication system according to the present invention.
Figure 4:
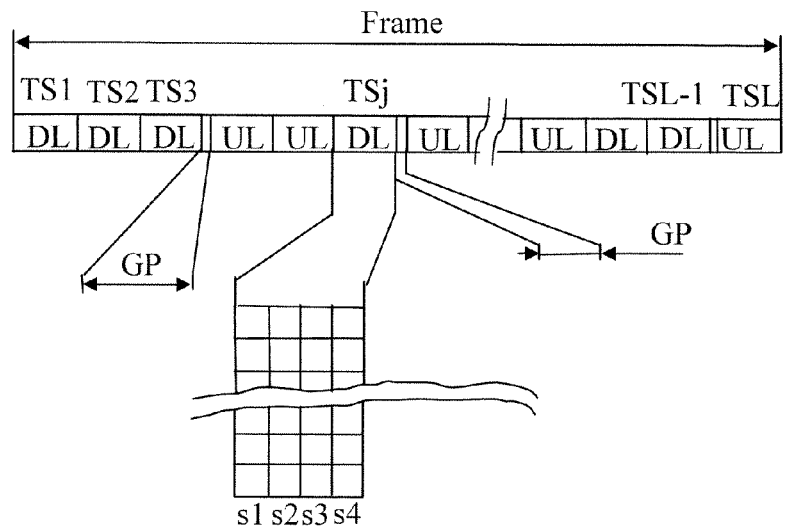
FIG. 4 is a chronogram depicting the structure of a conventional HD/OFDM frame.
Figure 5:
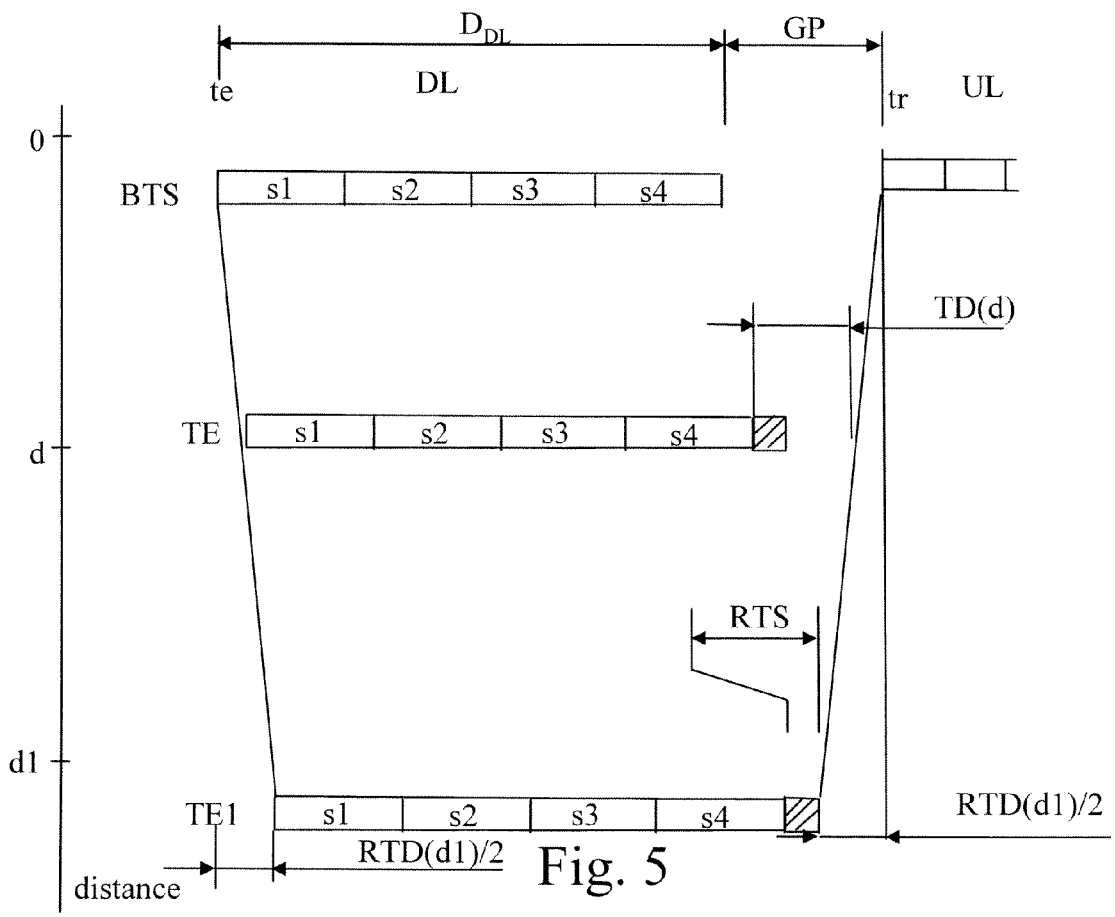
FIG. 5 is a chronogram depicting the transmission of information in the downlink of a telecommunication system according to the state of the art.

FIG. 3 is a diagram representing the architecture of a terminal according to the present invention.

Figure 8:
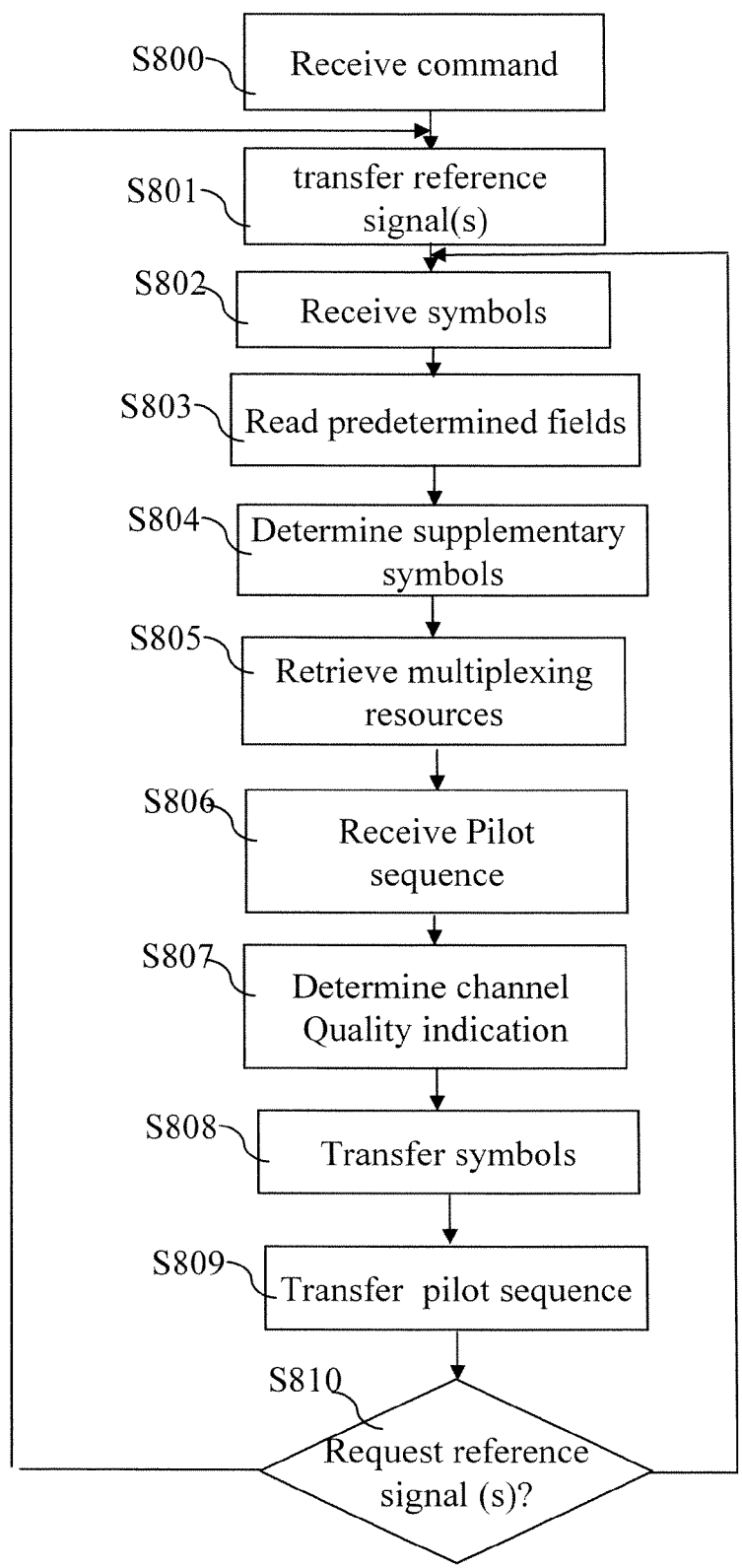
FIG. 8 is an algorithm executed by a terminal according to the present invention.

Each terminal TEi, as example the terminal TE1, has, for example, an architecture based on components connected together by a bus 301 and a processor 300 controlled by programs related to the algorithm as disclosed in the FIG. 8.

It has to be noted here that the terminal TE1 is, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303 and a channel interface 305.

The read only memory ROM 302 contains instructions of the program related to the algorithm as disclosed in the FIG. 8 which are transferred, when the terminal TE1 is powered on to the random access memory RAM 303.

The RAM memory 303 contains registers intended to receive variables, and the instructions of the program related to the algorithm as disclosed in the FIG. 8.

The channel interface 305 comprises means for receiving at least one reference signal request from the base station BTS and means for transferring at least one reference signal to the base station BTS.

The channel interface 305 comprises means for de-multiplexing each downlink symbol of the downlink sub frame received by the terminal TE1 on corresponding multiplexing resources allocated by the base station BTS if there are some.

The channel interface 305 comprises means for multiplexing 306 at least one set of pilot sequence elements on multiplexing resources in order to form at least one uplink supplementary symbol to be transferred to the base station BTS on multiplexing resources allocated to the terminal TE1.

The channel interface 305 comprises means for transferring at least one set of pilot sequence elements comprised in at least one supplementary uplink symbol on at least multiplexing resources allocated to the terminal TE1.

Preferably, at least one set of pilot sequence elements comprised in at least one supplementary uplink symbol is transferred on the multiplexing resources allocated to the terminal TE1 for the symbols comprised in the nominal part of the uplink sub frame.

Sometimes, in order to get information about channel conditions on other multiplexing resources, at least one set of pilot sequence elements comprised in at least one supplementary uplink symbol is transferred on the multiplexing resources which are not allocated to the terminal TE1 for the symbols comprised in the nominal part of the uplink sub frame.

The channel interface 305 comprises means for de multiplexing at least one set of pilot sequence elements comprised in at least one supplementary downlink symbol transferred by the base station BTS from the multiplexing resources allocated to the terminal TE1.

It has to be noted here that, in order to get information about channel conditions on other multiplexing resources, the channel interface 305 de multiplexes at least one set of pilot sequence elements comprised in at least one supplementary downlink symbol transferred by the base station BTS from other multiplexing resources than the one allocated to the terminal TE1.

FIG. 7 is an algorithm executed by a base station according to the present invention.

The present algorithm is executed by at least one base station BTS of the wireless telecommunication system. More precisely, the present algorithm is executed by the processor 200 of the base station BTS.

At step S700, the processor 200 commands the transfer, through the channel interface 205, of at least one reference signal by each terminal TEi, with i=1 to 3.

At next step S701, the processor 200 detects, through the channel interface 205, the reception of at least one reference signal transferred by each terminal TEi.

At next step S702, the processor 200 calculates a timing delay TD(d) for each terminal TEi, where d is the distance between the base station BTS and the terminal TEi.

Each timing delay TD(d) is calculated using the following formula:

$$TD(d)=tr-te-D_{DL}-RTD(d)=GP-RTD(d),$$

$D_{DL}$ being the total duration of the nominal part of the downlink sub frame to be transferred.

At the same step, the processor 200 calculates, for each terminal TEi, the Timing Advance using the following formula:

$$TA(d)=GP-TD(d).$$

At next step S703, the processor 200 commands the transfer of at least one of the data calculated at step S702 to each corresponding terminal TEi.

The data calculated at step S702 will be transferred by the channel interface 205 in the next downlink sub frame. The calculated data will be multiplexed with other data and transferred under the form of symbols of the nominal part of a downlink sub frame.

At next step S704, the processor 200 allocates the multiplexing resources of the wireless telecommunication system to at least a part of the terminals TE.

It has to be noted here that, when several hundreds of terminals TE communicate with the base station BTS, the processor 200 can allocate, for a sub frame, the multiplexing resources to only a part of the terminals TE. The processor 200 may then modify, for each sub frame, the terminals TE to which multiplexing resources are allocated.

Figures 9, 10A:
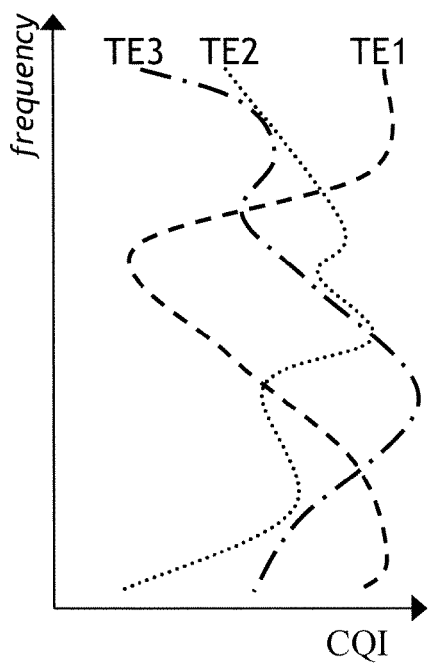

According to the first and second modes of realisation of the present invention, the processor 200 preferably allocates the multiplexing resources of the wireless telecommunication system to the terminals TE according to the channel quality indications as shown in the FIG. 9.

The multiplexing resources are, according to the first mode of realisation of the present invention, chunks of frequencies.

The multiplexing resources are, according to the second mode of realisation of the present invention, codes. A code is a sequence of bits. Preferably the allocated codes are orthogonal from each other.

Examples of allocated multiplexing resources will be described in reference to the FIG. 10.

The multiplexing resources are, according to the third mode of realisation of the present invention, areas of the coverage area 15 of the base station BTS.

An example of allocated multiplexing resources will be described in reference to the FIG. 12.

Figures 10D, 11, 12:
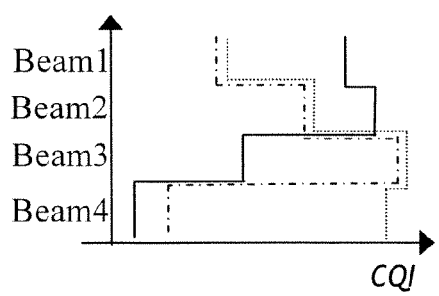
FIG. 10d is an example of symbols transferred by a terminal on allocated multiplexing resources of the wireless telecommunication system to the base station according to the first and second modes of realisation of the present invention.
FIG. 11 is an example of the channel quality indication determined between the base station and each terminal according to the third mode of realisation of the present invention.
FIG. 12 is an example of symbols transferred to terminals on allocated multiplexing resources of the wireless telecommunication system by the base station according to the third mode of realisation of the present invention.

According to the third mode of realisation of the present invention, the processor 200 preferably allocates the multiplexing resources of the wireless telecommunication system to the terminals TE which according to the channel quality indications as shown in the FIG. 11.

The multiplexing resources allocated to each terminal TEi are the multiplexing resources used by the base station BTS for multiplexing the downlink symbols, like s1 to s4 of the FIG. 6, of the nominal part of the downlink sub frame and/or are the multiplexing resources used by the base station BTS for de multiplexing the uplink symbols of the nominal part of an uplink sub frame.

The multiplexing resources allocated to each terminal TEi are the multiplexing resources used by the corresponding terminal TEi for de multiplexing the downlink symbols, like s1 to s4 of the FIG. 6, of the nominal part Dref of a sub frame and/or are the multiplexing resources used by the corresponding terminal TEi for multiplexing the uplink symbols of the nominal part of an uplink sub frame.

At next step S705, the processor 200 commands the transfer of the downlink symbols transferred in the nominal part of the downlink sub frame.

At next step S706, the processor 200 commands the transfer of the at least one supplementary downlink symbol if the at least one supplementary symbol is allocated for the downlink channel. The supplementary downlink symbol is formed by at least one set of pilot sequence elements which is multiplexed on at least one multiplexing resource of the wireless telecommunication network as it will be shown in reference to the FIGS. 10a to 10c.

At next step S707, the processor 200 receives at least one supplementary uplink symbol if the at least one supplementary symbol is allocated for the uplink channel. The supplementary symbol is formed by at least one set of pilot sequence elements multiplexed on at least one multiplexing resource allocated to the terminal TEi which transferred the supplementary uplink symbol as it will be shown in reference to the FIG. 10d.

At next step S708, the processor 200 determines the channel conditions, as example the channel quality indication as it will be disclosed in the FIG. 9 or 11 from the symbols received in the uplink channel.

At next step S709, the processor 200 checks if it is time to calculate again for each terminal TEi the corresponding timing delay TD(d) and/or the Timing Advance TA(d). As example and in a non limitative way, the timing delay TD(d) and/or the Timing Advance TA(d) are calculated on demand or periodically like every second.

If it is time to calculate again the timing delays and/or the Timing Advances, the processor 200 moves to step S710 and executes again the present algorithm.

If it is not time to calculate again the timing delays and/or the Timing Advances, the processor 200 returns to step S704 and executes the steps S704 to S709 as far as it is time to calculate again the timing delays and/or the Timing Advances.

It has to be noted here that, the terminals TE to which multiplexing resources have been allocated for a sub frame may change each time the loop constituted by the steps S704 to S709 is executed.

At step S710, the processor 200 checks whether or not reference signals need to be transferred by the terminals TE.

When the terminals TE transfer symbols in the uplink sub frames, the processor 200 can determine the Time Delay of the Timing Advance from these symbols. When the terminals TE don't transfer symbols in the uplink sub frames, the processor 200 needs to receive reference signals in order to determine the Time Delay or the Timing Advance.

If reference signals need to be transferred by the terminals TE, the processor 200 returns to step S700, otherwise the processor 200 returns to step S702.

FIG. 8 is an algorithm executed by a terminal according to the present invention.

The present algorithm is executed by each terminal TEi, where i=1 to 3, of the wireless telecommunication system. More precisely, the present algorithm is executed by the processor 300 of each terminal TEi.

At step S800, the processor 300 detects, through the channel interface 305, the reception of a request for transmission of at least one reference signal transferred by the base station BTS.

At next step S801, the processor 300 commands the transfer, through the channel interface 305, of at least one reference signal to the base station BTS.

At next step S802, the processor 300 detects the reception, through the channel interface 305, of downlink symbols.

At next step S803, the processor 300 reads at least one predetermined field of a control information comprised in the received symbols. The information comprised in the at least one predetermined field are information indicating the allocated multiplexing resources to the terminal TEi.

It has to be noted here that the received symbols may also comprise the timing delay TD(d) and/or the Timing Advance for the terminal TEi.

At next step S804, the processor 300 retrieves the information indicating the allocated multiplexing resources which are comprised in at least a field of the received control information.

More precisely, the processor 300 reads at least one field of a control information comprising information indicating the multiplexing resources which may be allocated to the terminal.

The multiplexing resources which are allocated to the terminal TEi for the de multiplexing of the at least one supplementary downlink symbol and/or for the multiplexing of the at least one supplementary uplink symbol are the same as the one allocated for de multiplexing downlink symbols comprised in the nominal part of the downlink sub frame and/or the same as the one allocated for multiplexing uplink symbols comprised in the nominal part of the uplink sub frame.

At the same step, the processor 300 commands the transfer of information indicating the allocated multiplexing resources to the channel interface 305.

At next step S806, the processor 300 detects the reception of the at least one supplementary downlink symbol if the at least one supplementary symbol is allocated for the downlink channel. The supplementary downlink symbol is formed by at least one set of pilot sequence elements assigned to at least one multiplexing resource of the wireless telecommunication network as it will be shown in reference to the FIGS. 10a to 10c.

At next step S807, the processor 300 determines the channel conditions, as example the channel quality indication as it will be disclosed in the FIG. 9 or 11 from the symbols received in the downlink channel At step S808, the processor 300 commands the transfer of symbols through the uplink channel if it is needed.

The symbols transferred are symbols comprised in the nominal part of the uplink sub frame.

At next step S809, the processor 200 commands the transfer of at least one supplementary uplink symbol if the at least one supplementary symbol is allocated for the uplink channel. The supplementary uplink symbol is formed by at least one set of pilot sequence elements which is assigned to at least one multiplexing resource allocated to the terminal TEi for the transfer of symbols comprised in the nominal part of the uplink sub frame as it will be shown in reference to the FIG. 10d.

The channel interface 305 multiplexes at least one supplementary uplink symbol transferred by the terminal TEi on the same multiplexing resources allocated by the base station for the symbols comprised in the nominal part of the uplink sub frame.

At next step S810 the processor 300 checks whether or not at least one reference signal needs to be received by the base station BTS.

If at least one reference signal needs to be received, the processor 300 returns to step S801, otherwise, the processor 300 returns to step S802.

FIG. 9 is an example of the channel quality indication determined between the base station and each terminal according to the first and the second modes of realisation of the present invention.

On the vertical axis of the FIG. 9, the frequency band is shown and the horizontal axis represents the value of the channel quality indications determined by each terminal TEi and reported to the base station BTS through the uplink channel in order to optimize the use of the downlink multiplexing resources.

In the FIG. 9, the curves of the channel quality indications determined by the terminals TE1 to TE3 are shown.

Such curves are used by the base station BTS for allocating the multiplexing resources to the terminals TE1 to TE3.

For the uplink channels, the base station BTS determines the channel quality indications on each uplink channel in order to optimize the use of the uplink multiplexing resources.

FIG. 10a is an example of symbols transferred by the base station on the multiplexing resources of the wireless telecommunication system to the terminals according to the first and second modes of realisation of the present invention.

The FIG. 10a discloses an example wherein four symbols are comprised in the nominal part of the downlink sub frame and two symbols are supplementary downlink symbols.

The FIG. 10a represents a table of twelve lines noted 1001 to 1012 and six columns noted 1051 to 1056. Each line 1001 to 1012 represents a chunk of frequencies according to the first mode of realisation or a code according to the second mode of realisation, each column 1051 to 1056 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1051 represents the symbol s1, the column 1052 represents the symbol s2, the column 1053 represents the symbol s3, the column 1054 represents the symbol s4, the column 1055 represents the supplementary downlink symbol s5 and the column 1056 represents the supplementary downlink symbol s6.

The base station BTS allocates to the terminal TE1 the chunks of frequencies or the codes noted 1001 to 1003 and 1010 to 1012 for the symbols s1 to s4.

The base station BTS allocates to the terminal TE2 the chunks of frequencies or the codes noted 1004 to 1006 for the symbols s1 to s4.

The base station BTS allocates to the terminal TE3 the chunks of frequencies or the codes noted 1007 to 1009 for the symbols s1 to s4.

Preferably and in a non limitative way, the base station BTS allocates the same chunks of frequencies or codes to a terminal TEi for all of the symbols s1 to s4 comprised in the nominal part of the downlink sub frame of the FIG. 6.

According to the example of the FIG. 10a, for the supplementary downlink symbol s5, the base station BTS assigns to each multiplexing resource, a set of pilot sequence elements PSI to PS12. For the supplementary downlink symbol s6, the base station BTS assigns to each multiplexing resource, a set of pilot sequence elements PS13 to PS24.

FIG. 10b is an example of symbols transferred by the base station on the multiplexing resources of the wireless telecommunication system to the terminals according to the first and second modes of realisation of the present invention.

The FIG. 10b discloses an example wherein four symbols are comprised in the nominal part of the downlink sub frame and two symbols are supplementary downlink symbols.

The FIG. 10b represents a table of twelve lines noted 1101 to 1112 and six columns noted 1151 to 1156. Each line 1101 to 1112 represents a chunk of frequencies according to the first mode of realisation or a code according to the second mode of realisation, each column 1151 to 1156 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1151 represents the symbol s1, the column 1152 represents the symbol s2, the column 1153 represents the symbol s3, the column 1154 represents the symbol s4, the column 1155 represents the supplementary downlink symbol s5 and the column 1156 represents the supplementary downlink symbol s6.

The base station BTS allocates to the terminal TE1 the chunks of frequencies or the codes noted 1101 to 1103 and 1110 to 1112 for the symbols s1 to s4.

The base station BTS allocates to the terminal TE2 the chunks of frequencies or the codes noted 1104 to 1106 for the symbols s1 to s4.

The base station BTS allocates to the terminal TE3 the chunks of frequencies or the codes noted 1107 to 1109 for the symbols s1 to s4.

Preferably and in a non limitative way, the base station BTS allocates the same chunks of frequencies or codes to a terminal TEi for all of the symbols s1 to s4 comprised in the nominal part of the downlink sub frame of the FIG. 6.

According to the example of the FIG. 10b, for the supplementary downlink symbol s5, the base station BTS assigns, to a part of the multiplexing resources, as example the multiplexing resources 1101, 1104, 1107 1110, a set of pilot sequence elements PS30 to PS33 and for the remaining multiplexing resources data.

Preferably, the base station BTS assigns one set of pilot sequence elements to one multiplexing resource allocated to each terminal TEi.

For the supplementary downlink symbol s6, the base station BTS assigns for each multiplexing resource, data.

FIG. 10c is an example of symbols transferred by the base station on the multiplexing resources of the wireless telecommunication system to the terminals according to the first and second modes of realisation of the present invention.

The FIG. 10c discloses an example wherein four symbols are comprised in the nominal part of the downlink sub frame and two symbols are supplementary downlink symbols.

The FIG. 10c represents a table of twelve lines noted 1201 to 1212 and six columns noted 1251 to 1256. Each line 1201 to 1212 represents a chunk of frequencies according to the first mode of realisation or a code according to the second mode of realisation, each column 1251 to 1256 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1251 represents the symbol s1, the column 1252 represents the symbol s2, the column 1253 represents the symbol s3, the column 1254 represents the symbol s4, the column 1255 represents the supplementary downlink symbol s5 and the column 1256 represents the supplementary downlink symbol s6.

The base station BTS allocates to the terminal TE1 the chunks of frequencies or the codes noted 1201 to 1203 and 1210 to 1212 for the symbols s1 to s4.

The base station BTS allocates to the terminal TE2 the chunks of frequencies or the codes noted 1204 to 1206 for the symbols s1 to s4.

The base station BTS allocates to the terminal TE3 the chunks of frequencies or the codes noted 1207 to 1209 for the symbols s1 to s4.

The base station BTS allocates the same chunks of frequencies or codes to a terminal TEi for all of the symbols s1 to s4 comprised in the nominal part of the downlink sub frame of the FIG. 6.

According to the example of the FIG. 10c, for the supplementary downlink symbol s5, the base station BTS assigns to a part of the multiplexing resources, as example the multiplexing resources 1201, 1204, 1207 1210, a set of pilot sequence elements PS40 to PS43.

Preferably, the base station BTS assigns one set of pilot sequence elements to one multiplexing resource allocated to each terminal TEi. The pilot symbols PS40 and PS43 are used by the terminals TE2 and/or TE3 for channel estimation.

In a variant, for the supplementary downlink symbol s5, the base station BTS assigns only to the multiplexing resources 1204 and 1207 a set of pilot sequence elements PS41 and PS42. As the terminals TE1 can not transmit or receive any supplementary symbols, no multiplexing resources are assigned to the sets of pilot sequence elements PS40 and PS43.

FIG. 10d is an example of symbols transferred by a terminal on allocated multiplexing resources of the wireless telecommunication system to the base station according to the first and second modes of realisation of the present invention.

The FIG. 10d discloses an example wherein four symbols are comprised in the nominal part of the uplink sub frame and two symbols are supplementary uplink symbols.

The FIG. 10d represents a table of twelve lines noted 1301 to 1312 and six columns noted 1351 to 1356. Each line 1301 to 1312 represents a chunk of frequencies according to the first mode of realisation or a code according to the second mode of realisation, each column 1351 to 1356 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1351 represents the first symbol of the nominal part of the uplink sub frame, the column 1352 represents the second symbol of the nominal part of the uplink sub frame, the column 1353 represents the third symbol of the nominal part of the uplink sub frame, the column 1354 represents the fourth symbol of the nominal part of the uplink sub frame, the column 1355 represents the first supplementary symbol and the column 1356 represents the second supplementary symbol.

The base station BTS allocates to the terminal TE1 the chunks of frequencies or the codes noted 1301 to 1303 and 1310 to 1312 for the symbols of the nominal part of the uplink sub frame.

The base station BTS allocates to the terminal TE2 the chunks of frequencies or the codes noted 1304 to 1306 for the symbols of the nominal part of the uplink sub frame.

The base station BTS allocates to the terminal TE3 the chunks of frequencies or the codes noted 1307 to 1309 for the symbols of the nominal part of the uplink sub frame.

Preferably and in a non limitative way, the base station BTS allocates to a terminal TEi the same chunks of frequencies or codes for all of the symbols comprised in the nominal part of an uplink sub frame and for the supplementary uplink symbols if there are some.

According to the example of the FIG. 10d, each terminal TEi which can transmit a supplementary uplink symbol, assigns sets of pilot sequence elements PS50 to PS55 to each multiplexing resource allocated to it.

The terminal TE2 assigns the sets of pilot sequence elements PS50 to PS52 to the respective multiplexing resources 1304, 1305 and 1306.

The terminal TE3 assigns the sets of pilot sequence elements PS53 to PS55 to the respective multiplexing resources 1307, 1308 and 1309.

Each terminal TEi which can transmit another supplementary uplink symbol, assigns a set of pilot sequence elements PS56 to PS58 to each multiplexing resource allocated to it.

The terminal TE3 assigns the sets of pilot sequence elements PS56 to PS58 to the respective multiplexing resources 1307, 1308 and 1309.

In variant, each terminal TEi which can transmit a supplementary uplink symbol, assigns a set of pilot sequence elements to a single multiplexing resource allocated to it.

In variant, each terminal TEi which can transmit a supplementary uplink symbol, assigns a set of pilot sequence elements to at least one multiplexing resource allocated to the terminal TEi, the other multiplexing resources allocated to the terminal TEi being used for the transfer of data.

In variant, each terminal TEi which can transmit a supplementary uplink symbol, assigns a set of pilot sequence elements to at least one multiplexing resource which is not allocated to the terminal TEi for the multiplexing of symbols comprised in the nominal part of the uplink sub frame.

FIG. 11 is an example of the channel quality indication determined between the base station and each terminal according to the third mode of realisation of the present invention.

On the vertical axis of the FIG. 11, the different beams Beam1 to Beam4 are shown and the horizontal axis represents the value of the channel quality indications determined by each terminal TEi and reported to the base station BTS through the uplink channel in order to optimize the use of the downlink multiplexing resources.

In the FIG. 11, the curves of the channel quality indications determined by the terminals TE to TE3 are shown.

Such curves are used by the base station BTS for allocating the multiplexing resources to the terminals TE1 to TE3.

For the uplink channels, the base station BTS determines the channel quality indications on each uplink channel in order to optimize the use of the uplink multiplexing resources.

FIG. 12 is an example of symbols transferred to terminals on allocated multiplexing resources of the wireless telecommunication system by the base station according to the third mode of realisation of the present invention.

The FIG. 12 discloses an example wherein four symbols are comprised in the nominal part of the downlink sub frame and two symbols are supplementary symbols.

The FIG. 12 represents a table of four lines noted 120 to 123 and six columns noted 124 to 129. Each line 120 to 123 represents a beam or an area in which signals are directed by the base station BTS according to the third mode of realisation, each column 124 to 129 represents a symbol of the FIG. 6. Such table is preferably generated for each sub frame.

The column 124 represents the symbol s1, the column 125 represents the symbol s2, the column 126 represents the symbol s3, the column 127 represents the symbol s4, the column 128 represents the supplementary symbol s5 and the column 129 represents the supplementary symbol s6.

The base station BTS allocates to the terminal TE the Beam1 and the Beam2 noted 120 and 121 for the symbols s1 to s4.

The base station BTS allocates to the terminal TE2 the Beam3 noted 122 for the symbols s1 to s4.

The base station BTS allocates to the terminal TE3 the Beam4 noted 123 for the symbols s1 to s4.

According to the example of the FIG. 12, for the supplementary downlink symbol s5, the base station BTS assigns to each multiplexing resource, a set of pilot sequence elements PSa to PSd. For the supplementary downlink symbol s6, the base station BTS assigns to each multiplexing resource, a set of pilot sequence elements PSe to PSh.

It has to be noted here that the different allocation schemes shown in reference to the FIG. 10 in the first and second modes of realisation of the present invention are also applicable to the third mode of realisation.

Naturally, many modifications can be made to the embodiments of the invention described above without departing from the scope of the present invention.

The invention claimed is:

1. A transmission method in a wireless telecommunication system including a base station to communicate with terminals over bidirectional communication channels, each channel supporting frames being divided into downlink sub frames and uplink sub frames, each downlink sub frame including a plurality of nominal symbols to be transmitted to at least two terminals, wherein a time delay of each terminal connected thereto is determined, said time delay being such that any terminal after having received all the symbols included in a downlink sub frame followed by an uplink sub frame may transmit other symbols over said uplink sub frame with said time delay so that the other symbols transmitted are received by said base station at a time separated from an end of a transmission by the base station of the downlink sub frame by a predefined guard period that is constant regardless of distance of each terminal to the base station, and wherein a transfer of one or more supplementary symbols between the base station and at least one terminal that receives or transmits said one or more supplementary symbols during the guard period is enabled, the method comprising:

obtaining multiplexing resources of the wireless telecommunication system for allocation of symbols to be transferred to the at least two terminals, the obtained multiplexing resources including the one or more supplementary symbols and the plurality of nominal symbols;

assigning use of the nominal symbols, for a first subset of the multiplexing resources, to a first terminal, and assigning use of the nominal symbols for a second subset of the multiplexing resources, different from the first subset of multiplexing resources, to a second terminal;

assigning to a first supplementary symbol for transfer during the guard period for only part of the first subset of the multiplexing resources of the first supplementary symbol corresponding to the first terminal, at least one first pilot sequence element, and assigning to the first supplementary symbol for only part of the second subset of the multiplexing resources of the first supplementary symbol corresponding to the second terminal, at least one second pilot sequence element, and not assigning remaining portions of the first and second subsets of the multiplexing resources; and transferring, during the guard period, to the first and second terminals, at least the first supplementary symbol, when the time delay of the first and second terminals is such that the first supplementary symbol is transferable during the guard period.

2. The method according to claim 1, wherein the multiplexing resources of the wireless telecommunication system are at least one of chunks of frequencies, codes, and areas of a coverage area of the base station.

3. The method according to the claim 1 or 2, wherein the method is executed by the base station.

4. The method according to claim 3, wherein the multiplexing resources are obtained by analyzing channel conditions that exist between the base station and each terminal connected to the base station, and the base station allocates the multiplexing resources of the wireless telecommunication system to the at least two terminals for demultiplexing of at least one set of pilot sequence elements.

5. The method according to the claim 3, wherein pilot sequence elements are assigned to one multiplexing resource of the multiplexing resources allocated to one terminal.

6. The method according to the claim 3, wherein pilot sequence elements are assigned to at least one multiplexing resource of the obtained multiplexing resources only for terminals that are designated to receive at least one supplementary symbol.

7. The method according to the claim 1 or 2, wherein the method is executed by a terminal.

8. The method according to claim 7, wherein the multiplexing resources are obtained by receiving a message from the base station.

9. The method according to the claim 7, wherein pilot sequence elements are assigned to one multiplexing resource of the obtained multiplexing resources.

10. The method according to the claim 7, wherein pilot sequence elements are assigned to at least one multiplexing resource of the obtained multiplexing resources and pilot sequence elements are assigned to at least one multiplexing resource different from the obtained multiplexing resources.

11. A non-transitory computer-readable medium encoded with computer instructions, which cause a programmable device to execute the steps of the method according to claim 1, when said computer instructions are executed on the programmable device.

12. The transmission method according to claim 1, wherein the transferring includes transferring the first supplementary symbol when the time delay of the first and second terminals is such that the first supplementary symbol is transferable during the guard period.

13. A telecommunication device in a wireless telecommunication system including a base station to communicate with terminals over bidirectional communication channels, each channel supporting frames being divided into downlink sub frames and uplink sub frames, each downlink sub frame including a plurality of nominal symbols to be transmitted to at least two terminals, wherein a time delay of each terminal connected thereto is determined, said time delay being such that any terminal after having received all the symbols included in a downlink sub frame followed by an uplink sub frame may transmit other symbols over said uplink sub frame with said time delay so that the other symbols transmitted are received by said base station at a time separated from an end of a transmission by the base station of the downlink sub frame by a predefined guard period that is constant regardless of distance of each terminal to the base station, and wherein a transfer of one or more supplementary symbols between the base station and at least one terminal that receives or transmits said one or more supplementary symbols during the guard period is enabled, the telecommunication device comprising:

means for obtaining multiplexing resources of the wireless telecommunication system for allocation of symbols to be transferred to the at least two terminals, the obtained multiplexing resources including the one or more supplementary symbols and the plurality of nominal symbols;

means for assigning use of the nominal symbols, for a first subset of the multiplexing resources, to a first terminal, and for assigning use of the nominal symbols, for a second subset of the multiplexing resources, different from the first subset of multiplexing resources, to a second terminal;

means for assigning to a first supplementary symbol for transfer during the guard period, for only part of the first subset of the multiplexing resources of the first supplementary symbol corresponding to the first terminal, at least one first pilot sequence element, and assigning to the first supplementary symbol for only part of the second subset of the multiplexing resources of the first supplementary symbol corresponding to the second terminal, at least one second pilot sequence element, and not assigning remaining portions of the first and second subsets of the multiplexing resources; and a channel interface configured to transfer, during the guard period, to the first and second terminals, at least the first supplementary symbol, when the time delay of the first and second terminals is such that the first supplementary symbol is transferable during the guard period.

14. The telecommunication device according to the claim 13, wherein the telecommunication device is included in the base station or a terminal.

15. The telecommunication device according to claim 13, wherein the channel interface is configured to transfer the first supplementary symbol when the time delay of the first and second terminals is such that the first supplementary symbol is transferable during the guard period.

* * * * *